(12) United States Patent
Gandhi (10) Patent No.: US 11,843,533 B2
(45) Date of Patent: Dec. 12, 2023

(54) END-TO-END PERFORMANCE AWARE TRAFFIC ENGINEERING FOR INTERNET PEERING

(71) Applicant: Microsoft Technology Licensing, LLC, Redmond, WA (US)

(72) Inventor: Rohan Gandhi, Pune (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/749,901

(22) Filed: May 20, 2022

(65) Prior Publication Data

US 2023/0275825 A1 Aug. 31, 2023

(30) Foreign Application Priority Data

Feb. 28, 2022 (IN) .............................. 202241010686

(51) Int. Cl.
*H04L 43/0894* (2022.01)
*H04L 45/00* (2022.01)
(Continued)

(52) U.S. Cl.
CPC ...... *H04L 43/0894* (2013.01); *H04J 14/0227* (2013.01); *H04L 5/0098* (2013.01);
(Continued)

(58) Field of Classification Search
CPC . H04L 43/0894; H04L 47/263; H04L 47/122; H04L 47/11; H04L 47/10;
(Continued)

(56) References Cited

U.S. PATENT DOCUMENTS

| 7,453,824 B1* | 11/2008 | Nucci | H04J 14/0227 |
| | | | 398/43 |
| 2008/0098127 A1* | 4/2008 | Engel | H04L 47/70 |
| | | | 709/238 |

(Continued)

OTHER PUBLICATIONS

"BGP Best Path Selection Algorithm", Retrieved from: https://www.cisco.com/c/en/us/support/docs/ip/border-gateway-protocol-bgp/13753-25.html, Sep. 12, 2016, 8 Pages.

(Continued)

*Primary Examiner* — Kyung H Shin
(74) *Attorney, Agent, or Firm* — ArentFox Schiff LLP (57) ABSTRACT

The present application relates to egressing traffic from an online service provider (OSP). A network system may determine routes for flows and rates for each flow in a coordinated manner based on end-to-end performance metrics for the flows. The network system includes a central controller configured to: receive end-to-end performance information and current rate information for traffic flows, each flow being from a source within the network system to an external destination, and calculate new rate information for the traffic flows. An aggregate rate for end-to-end flows remains constant from the current rate information to the new rate information. The network system includes at least one datacenter controller configured to assign routes for new traffic flows based on the end-to-end performance information of the traffic flows. The network system includes a plurality of end-hosts configured to enforce the new rate information for the traffic flows on the assigned routes.

20 Claims, 7 Drawing Sheets

(51) Int. Cl.
H04L 43/087 (2022.01)
H04L 45/12 (2022.01)
H04J 14/02 (2006.01)
H04L 5/00 (2006.01)

(52) U.S. Cl.
CPC .......... *H04L 43/087* (2013.01); *H04L 45/123* (2013.01); *H04L 45/22* (2013.01); *H04L 45/38* (2013.01)

(58) Field of Classification Search
CPC ......... H04L 47/70; H04L 45/02; H04L 45/04; H04L 47/724; H04L 45/28; H04L 45/22; H04L 45/023; H04L 47/785; H04L 47/826; H04L 45/302; H04L 47/805; H04L 45/128; H04L 5/0098; H04L 5/0091; H04L 5/0005; H04J 14/0227; H04J 14/0284; H04J 14/0241; H04W 28/0808; H04W 28/0831; H04W 28/0263
See application file for complete search history.

(56) References Cited

U.S. PATENT DOCUMENTS

2015/0071076 A1   3/2015  Izhak-Ratzin et al.
2015/0200856 A1*  7/2015  Hu ..................... H04L 43/0894
                                                    370/236
2022/0345930 A1* 10/2022  Uscumlic ............. H04L 5/0098

OTHER PUBLICATIONS

"IBM Products", Retrieved from: https://web.archive.org/web/20220520214127/http://www.ibm.com/products/category/business/commerce, May 20, 2022, 6 pages.
Babaioff, et al., "ERA: A Framework for Economic Resource Allocation for the Cloud", In ACM WWW Companion, Apr. 3, 2017, pp. 634-642.
Burtini, et al., "A survey of online experiment design with the stochastic multi-armed bandit", In Repository of arXiv:1510.00757v1, Oct. 2, 2015, 46 Pages.
Calder, et al., "Odin: Microsoft's Scalable Fault-Tolerant CDN Measurement System", In Proceedings of the 15th USENIX Symposium on Networked Systems Design and Implementation, Apr. 9, 2018, pp. 501-517.
Dalton, et al., "Andromeda: Performance, Isolation, and Velocity at Scale in Cloud Network Virtualization", In the Proceedings of the 15th USENIX Symposium on Networked Systems Design and Implementation., Apr. 9, 2018, pp. 373-387.
Dhamdhere, et al., "Inferring persistent interdomain congestion", In Proceedings of the Conference of the ACM Special Interest Group on Data Communication, Aug. 2018, pp. 1-15.
Dong, et al., "Pcc vivace: Online-learning congestion control", In Proceedings of the 15th USENIX Symposium on Networked Systems Design and Implementation, Apr. 9, 2018, pp. 343-356.
Dong, et al., "Pcc: Re-architecting congestion control for consistent high performance", In Proceedings of the 12th USENIX Symposium on Networked Systems Design and Implementation, May 4, 2015, pp. 395-408.
Firestone, et al., "Azure accelerated networking: Smartnics in the public cloud", In Proceedings of the 15th USENIX Symposium on Networked Systems Design and Implementation, Apr. 9, 2018, pp. 51-64.
Fouladi, et al., "Salsify: Low-latency network video through tighter integration between a video codec and a transport protocol.", In Proceedings of the 15th USENIX Symposium on Networked Systems Design and Implementation, Apr. 9, 2018, pp. 267-282.
Guichao, et al., "An End-to-end Flow Control Method Based on DQN", In Conference of 2022 International Conference on Big Data, Information and Computer Network, Jan. 20, 2022, pp. 504-507.
Han, et al., "Multi-path tcp: A joint congestion control and routing scheme to exploit path diversity in the internet", In Proceedings of IEEE/ACM Transactions on Networking ,vol. 14, Issue: 6, Dec. 2006, pp. 1260-1271.
He, et al., "Towards Robust Multi-Layer Traffic Engineering: Optimization of Congestion Control and Routing", In IEEE Journal on Selected Areas in Communications, vol. 25, Issue: 5, Jun. 2007, pp. 868-880.
Jiang, et al., "Cfa: A practical prediction system for video qoe optimization", In Proceedings of the 13th USENIX Symposium on Networked Systems Design and Implementation, Mar. 16, 2016, pp. 137-150.
Jiang, et al., "Pytheas: Enabling Data-Driven Quality of Experience Optimization Using Group-Based Exploration- Exploitation", In Proceedings of the 14th USENIX Symposium on Networked Systems Design and Implementation, Mar. 27, 2017, pp. 393-406.
Jiang, et al., "Via: Improving internet telephony call quality using predictive relay selection.", In Proceedings of the ACM SIGCOMM Conference, Aug. 22, 2016, 14 Pages.
Kelly, et al., "Stability of end-to-end algorithms for joint routing and rate control", In ACM SIGCOMM Computer Communication Review, vol. 35, Issue 2, Apr. 2005, pp. 5-12.
Khan, Farhan, "The Cost of Latency", Retrieved from: https://www.digitalrealty.com/blog/the-cost-of-latency, Mar. 10, 2015, 6 pages.
Lin, et al., "Joint rate control and scheduling in multihop wireless networks", In Proceedings of 43rd IEEE Conference on Decision and Control, Dec. 14, 2004, pp. 1484-1489.
Liu, et al., "Efficiently delivering online services over integrated infrastructure", In Proceedings of the 13th USENIX Symposium on Networked Systems Design and Implementation, Mar. 16, 2016, pp. 77-90.
Luckie, et al., "Challenges in Inferring Internet Interdomain Congestion", In Proceedings of the Conference on Internet Measurement Conference, Nov. 2014, pp. 15-22.
Mao, et al., "Neural Adaptive Video Streaming with Pensieve", In Proceedings of Conference of ACM Special Interest Group on Data Communication, Aug. 21, 2017, pp. 197-210.
Mao, et al., "Resource Management With Deep Reinforcement Learning", In Proceedings of the 15th ACM Workshop on Hot Topics in Networks, Nov. 9, 2016, pp. 50-56.
Moulines, et al., "On Upper-Confidence Bound Policies for Non-Stationary Bandit Problems", In Repository of arXiv preprint arXiv:0805.3415, May 22, 2008, 26 Pages.
"International Search Report and Written Opinion Issued in PCT Application No. PCT/US22/051117", dated Mar. 3, 2023, 16 Pages.
Schlinker, et al., "Engineering Egress with Edge Fabric: Steering Oceans of Content to the World", In Proceedings of the Conference of the ACM Special Interest Group on Data Communication, Aug. 2017, pp. 418-431.
Valadarsky, et al., "Learning to Route", In Proceedings of the 16th ACM Workshop on Hot Topics in Networks, Nov. 30, 2017, pp. 185-191.
Valancius, et al., "Quantifying the benefits of joint content and network routing", In Proceedings of the ACM SIGMETRICS/ international conference on Measurement and modeling of computer systems, Jun. 2013, pp. 243-254.
Winstein, et al., "TCP ex Machina: Computer-Generated Congestion Control", In Proceedings of ACM SIGCOMM Conference, Aug. 12, 2013, pp. 123-134.
Yap, et al., "Taking the edge off with espresso: Scale, reliability and programmability for global internet peering", In Proceedings of the Conference of the ACM Special Interest Group on Data Communication, Aug. 2017, pp. 432-445.
Yeo, et al., "How will deep learning change internet video delivery?", In Proceedings of the 16th ACM Workshop on Hot Topics in Networks, Nov. 2017, pp. 57-64.
Zhang, et al., "Optimizing Cost and Performance in Online Service Provider Networks", In Proceedings of the 7th USENIX Conference on Networked Systems Design and Implementation, Apr. 2010, pp. 1-15.

* cited by examiner

END-TO-END PERFORMANCE AWARE TRAFFIC ENGINEERING FOR INTERNET PEERING

CROSS REFERENCE TO RELATED APPLICATIONS

This application claims priority to Indian Application Number 202241010686 titled "END-TO-END PERFORMANCE AWARE TRAFFIC ENGINEERING FOR INTERNET PEERING," filed Feb. 28, 2022, which is assigned to the assignee hereof, and incorporated herein by reference in its entirety.

BACKGROUND

An online service provider (OSP) may host applications that may be accessed via multiple networks such as Internet Service Provider (ISP) networks. The OSP may offer a variety of services including native services provided by the OSP and hosted services controlled by third parties and hosted in OSP network. For example, an OSP may provide infrastructure as a service (IaaS) services such as virtual machines (VM), platform as a service (PaaS) services such as databases and serverless computing, and software as a service (SaaS) services such as authentication platforms.

An OSP network may be implemented on a wide area network that includes computing resources spread across a geographic region and connected via communication links such as fiber optic cables. The size of wide area networks may vary greatly from a small city to a global network. For example, a WAN may connect multiple offices of an enterprise, the customers of a regional telecommunications operator, or a global enterprise. The computing resources and connections within a WAN may be owned and controlled by the WAN operator.

Users or clients of the applications hosted by the OSP may obtain access to the OSP network or WAN via the Internet. A path between the client and the public cloud network may include one or more ISPs. In general, traffic traversing the Internet may be routed on a lowest cost basis. Accordingly, neither the client nor the OSP may have significant control of routing decisions between the client and the OSP network. From the perspective of the client, however, the performance of the OSP may be evaluated based on an end-to-end performance metric such as round trip time or throughput from the client to a host in the OSP network and back to the client. Accordingly, there is a need to improve routing for OSPs.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, the disclosure provides an online service provider (OSP) network system for egressing traffic. The network system includes a central controller configured to: receive end-to-end performance information and current rate information for traffic flows, each flow being from a source within the network system that hosts a service to a destination external to the network system, and calculate new rate information for the traffic flows. An aggregate rate for end-to-end flows remains constant from the current rate information to the new rate information. The network system includes at least one datacenter controller configured to assign routes for new traffic flows based on the end-to-end performance information of the traffic flows. The network system includes a plurality of end-hosts coupled with a respective one of the at least one datacenter controller and configured to enforce the new rate information for the traffic flows on the assigned routes for services hosted by the end-host.

In another example, the disclosure provides a method of network traffic routing for an online service provider (OSP) network system. The method includes receiving end-to-end performance information and current rate information for traffic flows, each flow being from a source that hosts a service within a network system to a destination external to the network system. The method includes assigning a route for a new flow based on the end-to-end performance information of the traffic flows. The method includes calculating new rate information for the traffic flows. An aggregate rate for end-to-end flows remains constant from the current rate information to the new rate information. The method includes enforcing the new rate information for the traffic flows on the assigned routes for hosted services.

In another example, the disclosure provides a non-transitory computer-readable medium storing computer executable instructions for network traffic routing. The non-transitory computer-readable medium includes instructions to receive border gateway protocol (BGP) updates from points of presence (POPs) where a network system is peered with other networks. The non-transitory computer-readable medium includes instructions to determine routes to destinations in the other networks based on the BGP updates. The non-transitory computer-readable medium includes instructions to receive end-to-end performance information and current rate information for traffic flows, each flow being from a source that hosts a service within the network system to a destination. The non-transitory computer-readable medium includes instructions to calculate new rate information for the traffic flows. An aggregate rate for end-to-end flows remains constant from the current rate information to the new rate information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to egress traffic routing in an online service provider (OSP) network. Because an OSP network may be accessed via the Internet, the OSP may not control an end-to-end path between a client and a host for a service. For example, traffic for the OSP network may traverse one or more Internet Service Providers (ISPs) between the client and an edge of the OSP network. The ISP may be referred to as Autonomous Systems (ASes) as each AS may be designed and managed independently. However, because the OSP traffic traverses the ISPS, a client or a user of a client device may associate delays in routing over the Internet with a quality of the OSP.

Although an OSP network does not have control over routing within or between the ISPs, the OSP network may control routing of egress traffic within the OSP network. For example, the OSP network may select an edge router within the OSP network and a first external network (e.g., a point of presence (POP)) to receive the egress traffic. Further, the OSP has control over traffic rates for each service hosted in the OSP network.

Egress traffic engineering may refer to sending traffic from OSPs to users. OSPs have traditionally relied on Border Gateway Protocol (BGP) to select routes among multiple available routes. Although the performance of online services depend on the route selected, BGP does not consider performance when selecting the routes. Such performance-oblivious routing can result in congestion and poor user experience. Because ASes do not share the topology, internal routing, and traffic information with other ASes, the online services are left in dark about the available capacity in remote ASes. Even if OSPs send traffic without congesting their own peering link, the traffic can cause congestion in other ASes. Congestion frequently occurs in remote ASes and negatively affects application performance and user experience.

Existing egress traffic engineering designs use network-level metrics (such as latency, goodput, fair sharing) when making (network layer) traffic engineering decisions that may bear poor co-relation to end-to-end performance (such as video buffer underflows or lag when editing a collaborative document). For example, existing designs pin high priority services to historically low latency routes hoping for better performance. However, such paths may have lower capacity and assigning flows that require high bandwidth to such routes is going to degrade performance of such flows. Also, in case of congestion, all flows on all services on the congested path end up sharing bandwidth equally due to transmission control protocol (TCP). However, as different services have different sensitivity to bandwidth, such fair-sharing can affect bandwidth sensitive flows more than other flows again de-grading their performance.

In an aspect, the present disclosure provides for end-to-end performance aware traffic engineering for Internet peering that improves overall end-to-end performance of online services. Additionally, as end-to-end performance jointly depends on the routes (that govern the latency) and traffic sending rates, routes and (traffic sending) rates in traffic engineering should not be calculated completely independently. Traffic engineering decisions (deciding routes and data sending rates) should consider end-to-end performance, and route and rate selection needs strong co-ordination as the end-to-end performance jointly depends on the latency (on the route) and rate. However joint calculation suffers from non-trivial challenges mainly due to unknown conditions in remote ISPs.

In an aspect, a network system of the present disclosure assigns routes and rates for network flows using end-to-end performance. The infrastructure for measuring end-to-end performance already exists in OSPs (e.g., a video delivery service already knows quality of video or frequency of underbuffer) used by application engineers to get insights in their services. This infrastructure may be repurposed to periodically report the end-to-end performance to the traffic engineering system for assigning routes and rates. In addition to the goal of improving end-to-end performance by selecting routes and rate carefully, the system may also improve resiliency of online services by providing low jitter (performance variations), low latency in selecting routes and rates, fast failure recovery, and scaling to hundreds of millions of flows.

The network system may include a central controller, datacenter controllers, end-hosts executing in the datacenters, and POPs. The network system may split route and rate control across the hierarchical control plane while maintaining strong co-ordination. In the network system, a central controller adjusts the rates of the existing flows using global knowledge at coarser time granularities (e.g., seconds). The central controller uses an integer linear program (ILP) based approach to periodically assign the rates across all flows. The ILP may execute on the scale of less than 1 second whereas a joint optimization of routes and rates for would be on the order of hours. The datacenter controllers assign routes using (slightly stale) global knowledge and run at finer time granularities (e.g., milliseconds). In some implementations, the route assignment may be implemented on a field programmable gate array (FPGA) and assign close-to-optimal routes in 3 microseconds. An exploration-exploitation design to assign the routes to new flows, allows improvement of route optimality and speed. Lastly, the end-hosts enforce the assigned routes and rates and also react to congestion in real-time.

Figure 3:
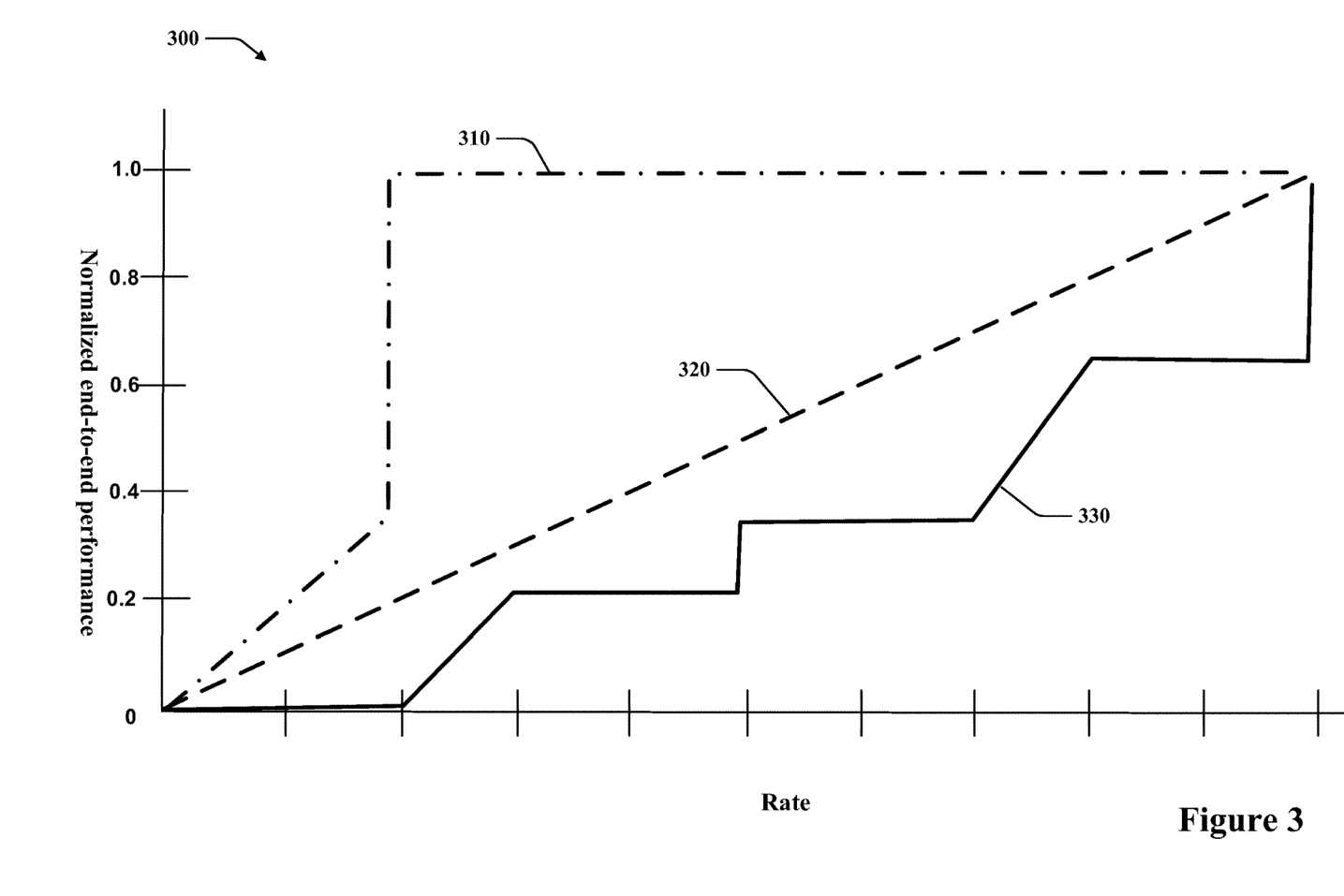
FIG. 3 is a diagram of an example of normalized performance metrics for services provided by an OSP network, in accordance with aspects described herein.
Figure 4:
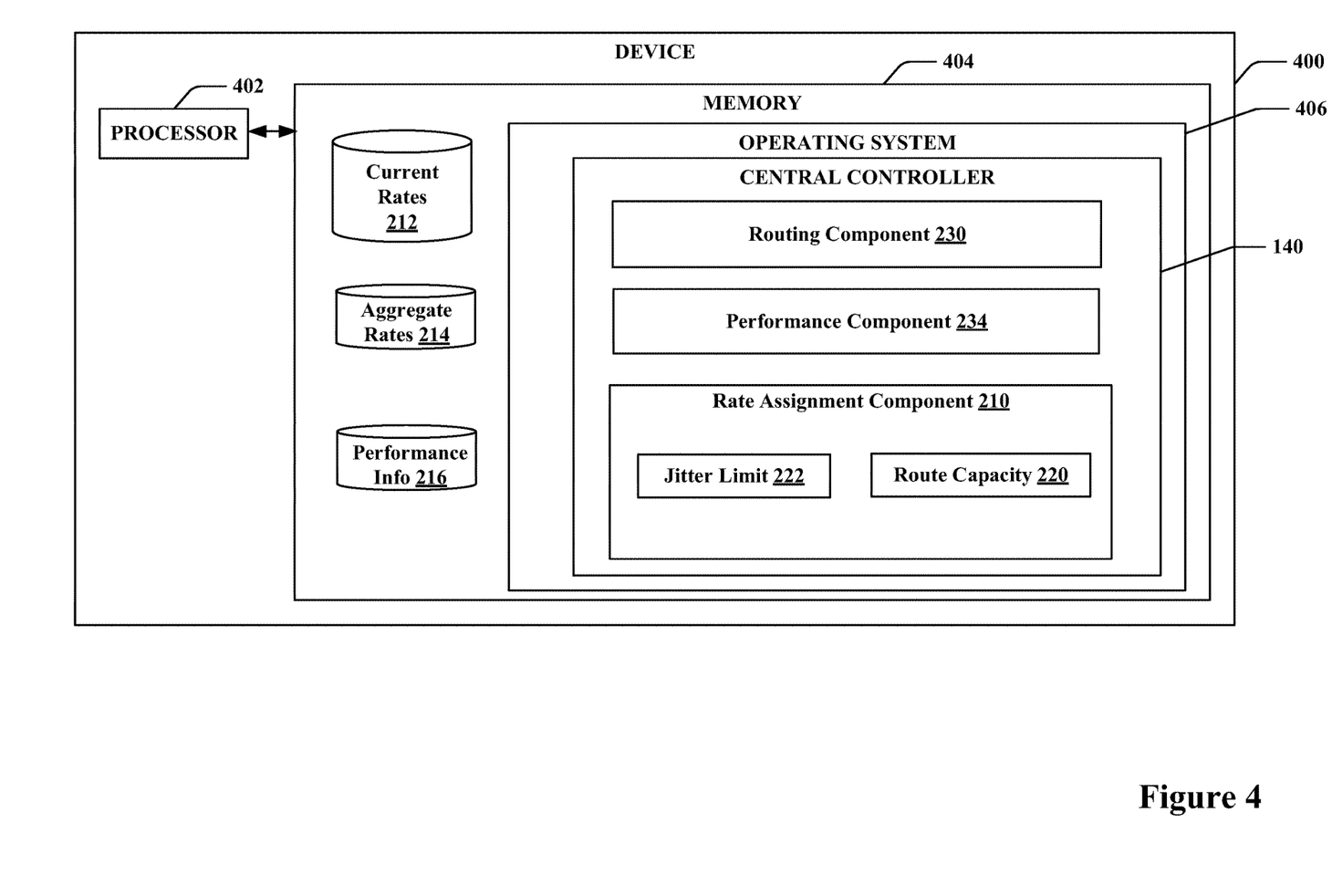
FIG. 4 is a schematic diagram of an example of a device for controlling rates of egress traffic from end-hosts in an OSP network, in accordance with aspects described herein.
Figure 5:
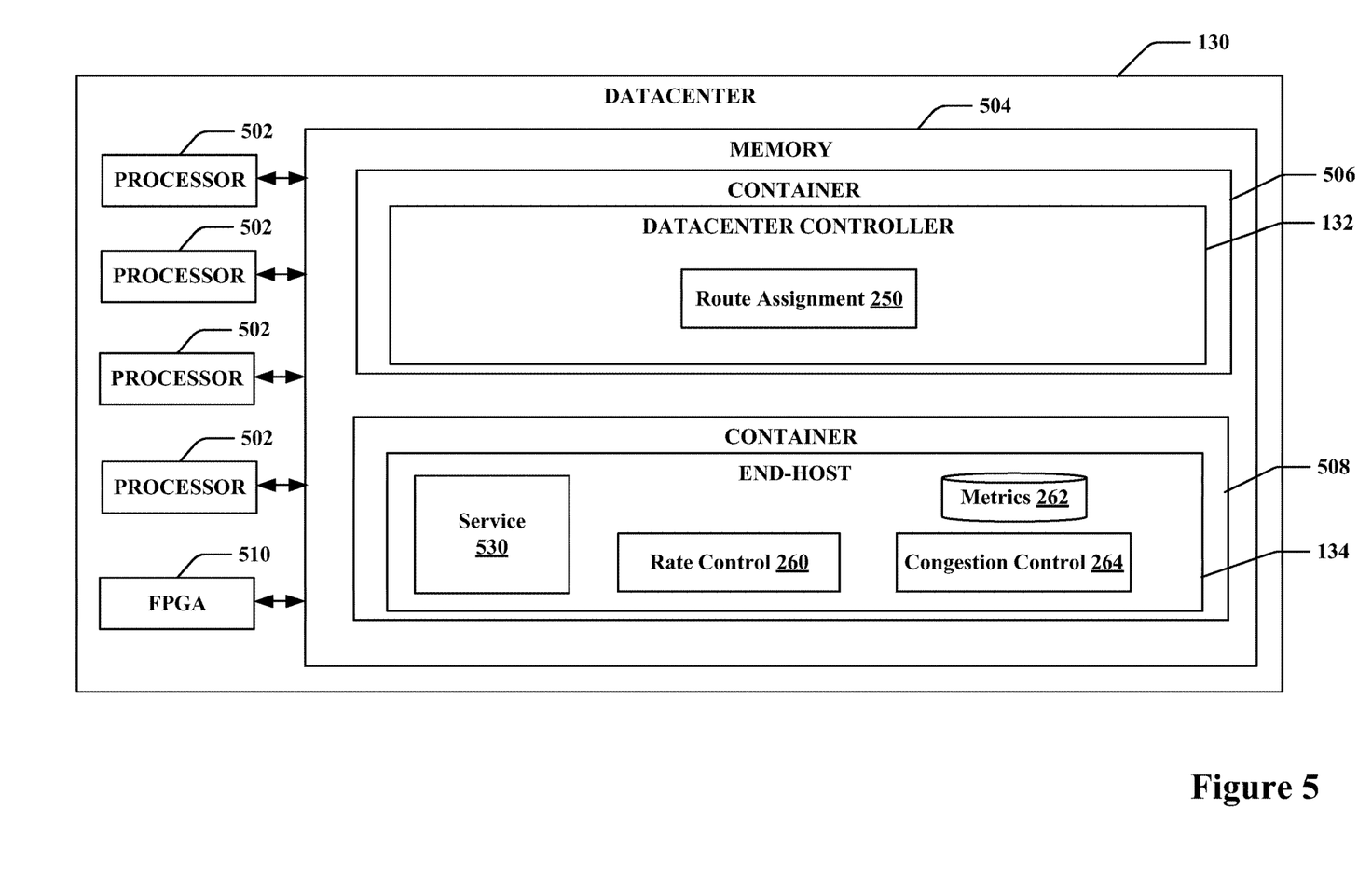
FIG. 5 is a schematic diagram of an example of a datacenter for hosting various network routing capabilities including a datacenter controller and end-hosts, in accordance with aspects described herein.

Turning now to FIGS. 1-6, examples are depicted with reference to one or more components and one or more methods that may perform the actions or operations described herein, where components and/or actions/operations in dashed line may be optional. Although the operations described below in FIG. 5 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

Figure 1:
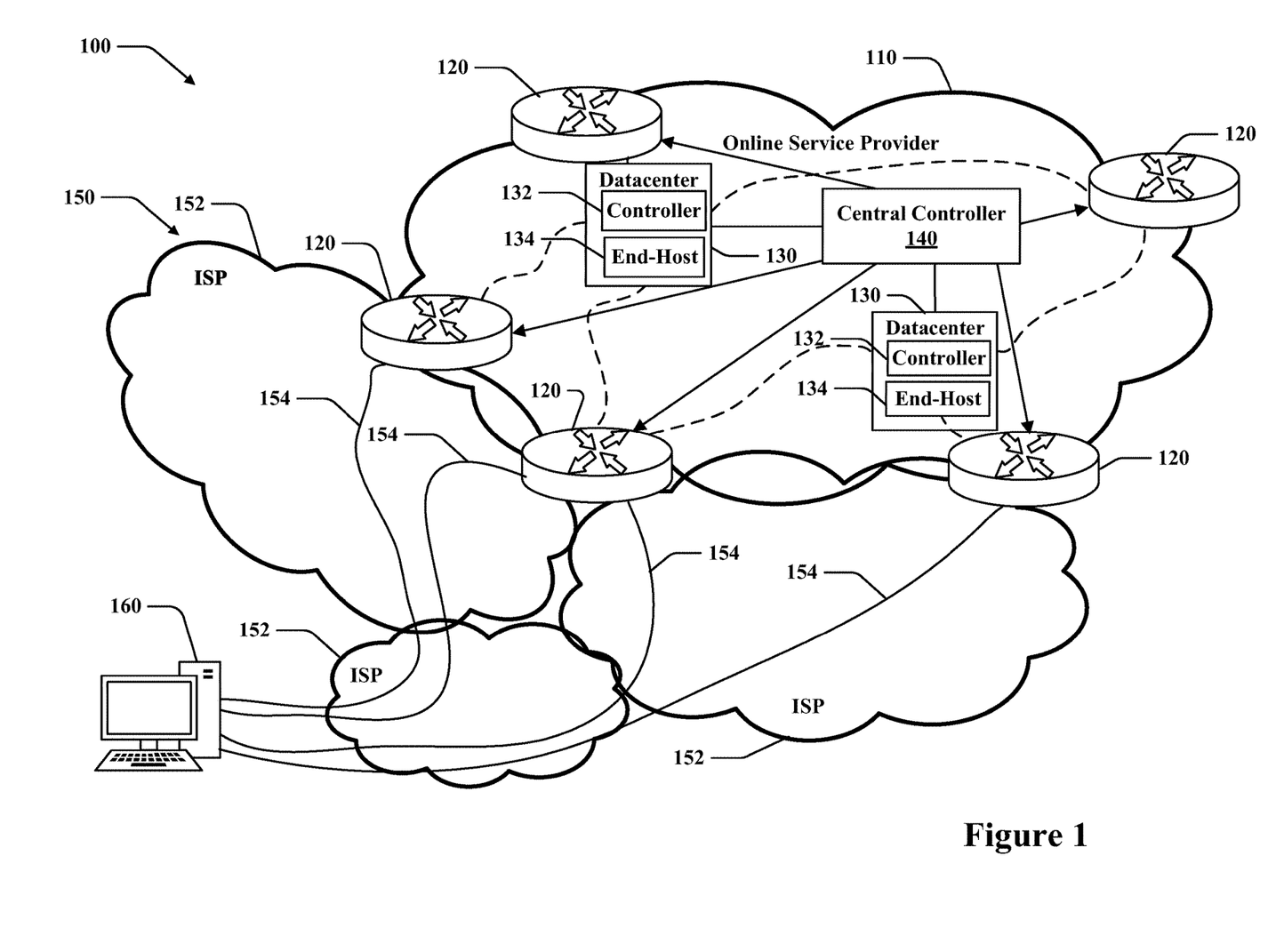
FIG. 1 is a diagram of an example of an architecture for egress routing from an OSP network, in accordance with aspects described herein.

FIG. 1 is a conceptual diagram 100 of an example of an architecture for an OSP network 110. The OSP network 110 may include computing resources that are controlled by a network operator and accessible to public clients 160 via an internet 150. For example, the OSP network 110 may include a plurality of datacenters 130. Each datacenter 130 may include a datacenter controller 132 and end-hosts 134. Each end-host 134 may be, for example, a virtual machine on a computing resource such as a server located in the datacenter 130. The OSP network 110 may include points of presence (POPS), which may include routers that connect the end-hosts 134 to external networks 152 such as internet service providers (ISPs) that form the internet 150. The network operator may charge a client 160 to access one or more services provided by the OSP network 110 and/or charge a service operator (e.g., a web application) for hosting a service on an end-host 134.

In an example use case, the client 160 may make a request to a service on an end-host 134. The end-host 134 may process the request according to the service and send traffic to the client 160 and/or another client associated with the service. As illustrated, the architecture of the OSP network 110 may include numerous paths between the end-host 134 and a client 160. The paths may include an internal portion within the OSP network 110 (e.g., from the end-host 134 to a POP 120) that is entirely under control of the operator of the public cloud network 110. The paths may also include an external portion (e.g., from the POP 120 to the client 160) that is controlled by the external networks 152 that form the Internet 150. Conventionally, routing over an Internet 150 is performed on a best-efforts basis. For example, each external network 152 (e.g., an ISP) may be associated with a border gateway protocol (BGP) session 154. The BGP session may advertise available routes, but such routes may not provide any performance guarantees or metrics. The end-host 134 may egress traffic based on static routing rules. For example, the static routing rules may define a path that will eventually reach the client 160 via one of the BGP sessions. Similarly, routing within the internet 150 may be performed on a best-efforts basis, where external networks 152 may select a route for traffic using static routing rules, for example, based on cost.

In an aspect, routing of egress traffic from an OSP network may be improved by selecting a route and rate for traffic of a service. The OSP network 110 may include a central controller 140 that receives end-to-end performance information and current rate information for traffic flows. Each flow may include traffic from a source (e.g., an end-host 134) within the network system to a destination (e.g., client 160) external to the network system. The central controller 140 may calculate new rate information for the traffic flows. In an aspect, when calculating the new rate information, the central controller 140 may ensure that an aggregate rate for end-to-end flows remains constant from the current rate information to the new rate information. By fixing the aggregate rate, the changed rates should not affect other traffic flowing through the ISPs. The datacenter controllers 132 may be configured to assign a route for a new flow based on the end-to-end performance information of the traffic flows. A flow may generally maintain the same route unless performance falls below a threshold, at which point the datacenter controller may assign a new route to the flow. The end-hosts 134 may enforce the new rate information for the traffic flows on the assigned routes. That is, the end-hosts 134 may enforce the new rate information by outputting traffic packets along the assigned routes at the assigned rates.

Figure 2:
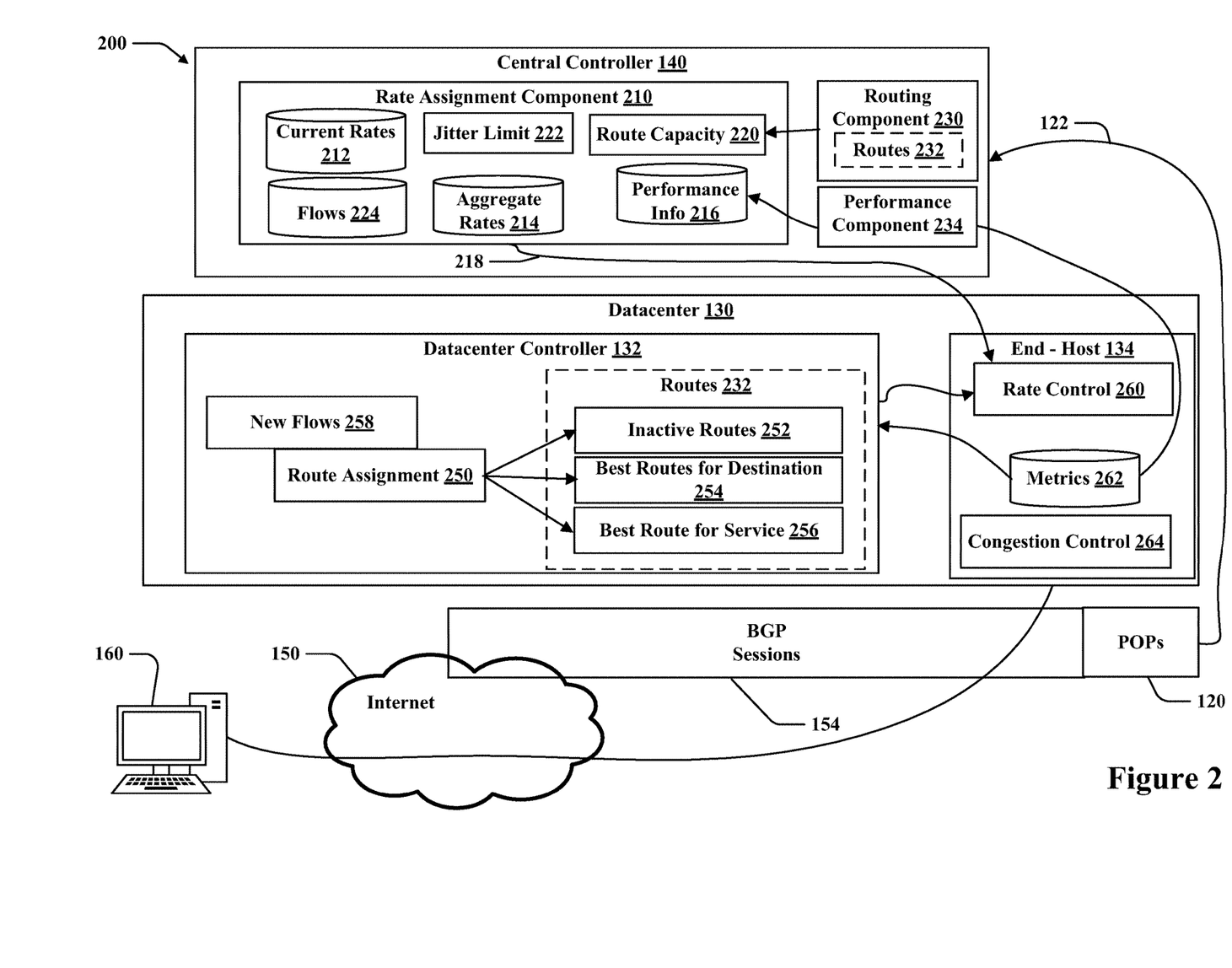
FIG. 2 is a diagram of an example of data flow between various components of an OSP network, in accordance with aspects described herein.

FIG. 2 is a diagram 200 of an example of data and control flow between components of the OSP network 110. The central controller 140 may include a performance component 234 configured to receive end-to-end performance information and current rate information for traffic flows, each flow being from a source within the network system to a destination external to the network system. The central controller 140 may include a rate assignment component 210 configured to assign traffic rates to flows and a routing component 230 configured to determine available routes from a source (e.g., end-host 134 or datacenter 130) to a destination (e.g., client 160).

The routing component 230 may receive routing information (e.g., BGP updates 122) from POPs 120 or associated edge routers. The routing component 230 may determine routes 232 from datacenters 130 and/or end-hosts 134 to destinations based on the BGP updates (e.g., according to BGP). The BGP routes may indicate that traffic may reach the destination from the source, but may not provide any information regarding performance of the route.

The performance component 234 may receive metrics 262 from end-hosts 134, which may be instantiated on various datacenters 130 throughout the OSP network 110. The performance component 234 may generate performance information 216, which may be end-to-end performance information. In some implementations, the performance component 234 normalizes the performance information. For example, each end-host 134 may provide metrics based on a service provided by the end-host 134. The performance component 234 may normalize the metrics 262 for each service, for example, with the best performing flow being assigned a 1, and the performance information for other flows scaled between 0 and 1. The normalized performance information 216 may allow weighting between different services.

The rate assignment component 210 may calculate rate information for traffic flows. In some implementations, the rate assignment component 210 uses an integer linear program (ILP) to calculate new rate information that attempts to maximize a weighted metric of total end-to-end performance for the traffic flows. The rates may be calculated separately from route assignment. That is, the ILP may not attempt to maximize both rates and routes because such a calculation may become infeasible at scale. For instance, an ILP can have 100s of millions of variables (on the order of the number of flows) that cannot be solved for both rate and route in a reasonably short amount of time.

The rate assignment component 210 may also receive current rate information 212 from each end-host 134. The current rate information 212 may differ from calculated rate information, for example, due to congestion control at the end-host 134.

The rate assignment component 210 may attempt to maximize the weighted metric of total end-to-end performance for the traffic flows while keeping an aggregate rate 214 for end-to-end flows constant. The aggregate rate 214 may represent the contribution of the OSP to congestion in the external networks 152. During congestion, the flows (sharing a congested link) will resort to fair sharing, which is agnostic to end-to-end performance and can perform poorly. Because the routing in remote ISPs is opaque to the OSP, the central controller 140 does not accurately know which flows share the congested links. Accordingly, the central controller 140 adjusts the rates among flows on the same routes to the same destinations (that most likely share the same congested links) while keeping the aggregated rates of such flows unchanged so that the new rates do not affect other flows on those routes.

An example ILP for the rate assignment component 210 may attempt to maximize a total weighted metric of end-to-end performance for the traffic flows. The total weighted metric may be a sum of weighted metrics for each flow. The ILP may adjust a traffic rate (e.g., current rate information 212) assigned to each flow subject to constraints on resource capacity and/or jitter. In some implementations, the ILP may be expressed as:

$$\text{Maximize } \Sigma_{f \in F_{l,d}, b \in B} w_f \cdot p_{a,b}^f \cdot x_b^f,$$

where B is a set of all rates, $r_b$ is a rate for a b-th index, $F_{l,d}$ is a flow on the l-th route for the d-th destination, $w_f$ is a weight of the f-th flow, $p_{a,b}^f$ is a performance metric of the f-th flow when assigned to an a-th AS path with the rate for the b-th index, and $x_b^f$ is the rate assigned to the f-th flow. $p_{a,b}^f$ may correspond to the performance info 216 collected from the end-hosts 134.

A resource capacity constraint (route capacity 220) may be expressed as:

$$\forall l \in L, d \in D, \sum_{f \in F_{l,d}, b \in B} x_b^f \cdot r_b \leq C_{l,d},$$

where D is the set of destinations, and $C_{l,d}$ is a capacity of the l-th route for the d-th destination. The capacity may be a sum of the calculated rates for each flow. For example, $C_{l,d} = \Sigma_{f \in F_{l,d}} r_{cur}^f$, is the currently observed rate for the f-th flow. Accordingly, the ILP may be constrained by a capacity of each respective route estimated based on the current rate information for traffic flows assigned to the respective route.

A jitter constraint (jitter limit 222) may be expressed as:

$$\forall f \in F, b \in B, -T \leq (p_{a,b}^f \cdot x_b^f - p_{a,r_{cur}}^f) \leq T,$$

where T is a threshold for limiting jitter and $p_{a,r_{cur}}^f$ is a performance metric of the f-th th flow when assigned to an a-th AS path (e.g., a route 232) with a current rate for the f-th flow. Accordingly, the ILP may be constrained by a jitter limit that defines a maximum change of the rate for a flow.

The ILP may generate near optimal solutions, which may be output to the as new rate information 218. In an aspect, the rate assignment may be highly scalable because the ILPs for different routes and destinations may be independent and can be executed in parallel. Accordingly, the speed or rate assignment may be scaled based on the number of flows and resources available.

The central controller 140 may provide the new rate information 218 to the end-hosts 134. In an aspect, each end-host 134 may include a rate control component 260 that enforces the assigned rate for each flow. Each end-host 134 may also include a congestion control component 264 that performs congestion control in response to congestion. For example, the congestion control component 264 may implement a fair sharing algorithm according to transmission control protocol (TCP) that results in a lower rate than the assigned rate. The congestion control may be agnostic to performance. In an aspect, the assigned rates are selected to minimize such congestion control.

The datacenter controller 132 may include a route assignment component 250 configured to assign a route to each new flow 258. The route assignment component 250 may assign routes based on an exploration and exploitation design that seeks to find good routes and then assign traffic to routes with good performance. In some implementations, the route assignment component 250 may classify routes into different categories. For example, inactive routes 252 may include routes that have not been assigned any flows to the destination. The route assignment component 250 may prioritize inactive routes for the exploration phase of the design (e.g., to collect metrics). Best routes for a destination 254 may include routes that have the best performance metric for flows of other services. Once again, for exploration purposes, a flow for a particular service may be assigned to a best route for a destination 254 when there are no other flows for the particular service on that route to explore whether the route provides good performance for the particular service. Best routes for a service 256 may include a route to the destination having a performance metric for flows of the service. If all routes to the destination have been explored (e.g., assigned a flow), then the route assignment component 250 may select the best performing route for the service. The route assignment component 250 may provide the assigned route to the rate control component 260 of the end-host 134.

In some implementations, the route assignment component 250 may account for history. For example, the above assignment algorithm may be considered a greedy algorithm designed for simplicity, scalability, and low latency. A deep learning model may be trained on historical information to select routes that improve performance. In some implementations, the route assignment component 250 may account for network status. For example, the route assignment component 250 may consider network telemetry data from route anomaly detection and remediation (RADAR), border management protocol (BMP), simple network management protocol (SNMP), interne protocol flow information export (IPFIX), or other network monitoring systems or protocols.

FIG. 3 is a chart 300 of examples of normalized performance metrics for various example services. In an aspect, the performance for each flow may be normalized compared to a best performance of a flow for a service.

The service 310 may be, for example, a collaborative editing service and the performance metric may be based on a latency measurement. The performance metric for the service 310 may generally improve as the rate increases, but then reach a point where all requests are handled efficiently within the rate. Accordingly, all rates beyond the point may produce the maximum normalized performance metric of 1. The service 320 may be, for example, a file transfer service (e.g., file download). The performance metric may be, for example, bitrate or throughput. The performance metric may improve linearly with the rate. The service 330 may be, for example, a video streaming service. The performance metric for service 330 may be a combination of factors such as bitrate, dropped packets, or jitter. The performance metric for service 330 may increase at various slopes depending on, for example, whether the increase in rate allows a better resolution.

Normalizing the performance metrics for each service may allow each service to compute a performance metric that is appropriate to the particular service. The central controller may take into account the normalized performance metrics for different services without concern for how the metric is calculated. The central controller may assign weights to each service to prioritize performance between services.

FIG. 4 is a schematic diagram of an example of an apparatus 400 (e.g., a computing device) for controlling rates of egress traffic from end-hosts in an OSP network. The apparatus 400 may be implemented as one or more computing devices in the OSP network 110.

In an example, the apparatus 400 can include a processor 402 and memory 404 configured to execute or store instructions or other parameters related to providing an operating system 406, which can execute one or more applications or processes, such as, but not limited to, the central controller 140. For example, processor 402 and memory 404 may be separate components communicatively coupled by a bus (e.g., on a motherboard or other portion of a computing device, on an integrated circuit, such as a system on a chip (SoC), etc.), components integrated within one another (e.g., processor 402 can include the memory 404 as an on-board component), and/or the like. Memory 404 may store instructions, parameters, data structures, etc. for use/execution by processor 402 to perform functions described herein.

In an example, the central controller 140 may include the routing component 230 and the rate assignment component 210. The current rate information 212, aggregate rates 214, and performance information 216 may also be stored in memory 404. The rate assignment component 210 may be configured to calculate new rate information for the traffic flows, where an aggregate rate for end-to-end flows remains constant from the current rate information to the new rate information. The routing component 230 may receive BGP updates from POPs and broadcast routes to destinations to the at least one datacenter controller.

FIG. 5 is a schematic diagram of an example of a datacenter 130 for hosting various network routing capabilities including a datacenter controller 132 and end-hosts 134. The datacenter 130 may be implemented as one or more computing devices in the OSP network 110.

In an example, the datacenter 130 can include a plurality of processors 502 and memory devices shown collectively as memory 504. The computing resources (processors 502 and memory 504) of the datacenter may be allocated to containers 506, which may include, for example, virtual machines, process isolated containers, or kernel isolated containers. The containers may be configured to execute or store instructions or other parameters related to providing one or more applications or processes, such as, but not limited to, the datacenter controller 132 and end-hosts 134. For example, processor 502 and memory 404 may be separate components communicatively coupled by a bus (e.g., on a motherboard or other portion of a computing device, on an integrated circuit, such as a system on a chip (SoC), etc.), components integrated within one another (e.g., processor 402 can include the memory 504 as an on-board component), and/or the like. Memory 504 may store instructions, parameters, data structures, etc. for use/execution by processor 502 to perform functions described herein.

In an example, the datacenter controller 132 may be implemented in a container 506. In some implementations, the datacenter 130 may include special processing resources such as a FPGA 510 that is configured perform the route assignment function of the route assignment component 250. For example, an FPGA 510 may be configured to search 40 egress interfaces (i.e., routes) in parallel. The performance information for each flow (e.g., up to 1 million flows) may be stored in relatively fast block random access memory (BRAM). The FPGA 510 may be assigned to the container 506. The datacenter controller 132 may be responsible for assigning routes for end-hosts 134 located in the same datacenter 130.

As another example, an end-host 134 may be implemented in a container 508. The end-host 134 may execute a service 530 that generates egress traffic. The end-host may include the rate control component 260 that is configured to enforce the assigned rates for flows of the service 530. The rate control component 260 may also label traffic for each flow with a label corresponding to the route assigned to the flow. In some implementations, the end-host 134 includes the congestion control component 264 that is configured to perform congestion control on congested routes based on fair sharing (e.g., according to TPC). The end-host 134 may also collect metrics 262 from the service 530 and provide the metrics to the central controller 140.

Figure 6:
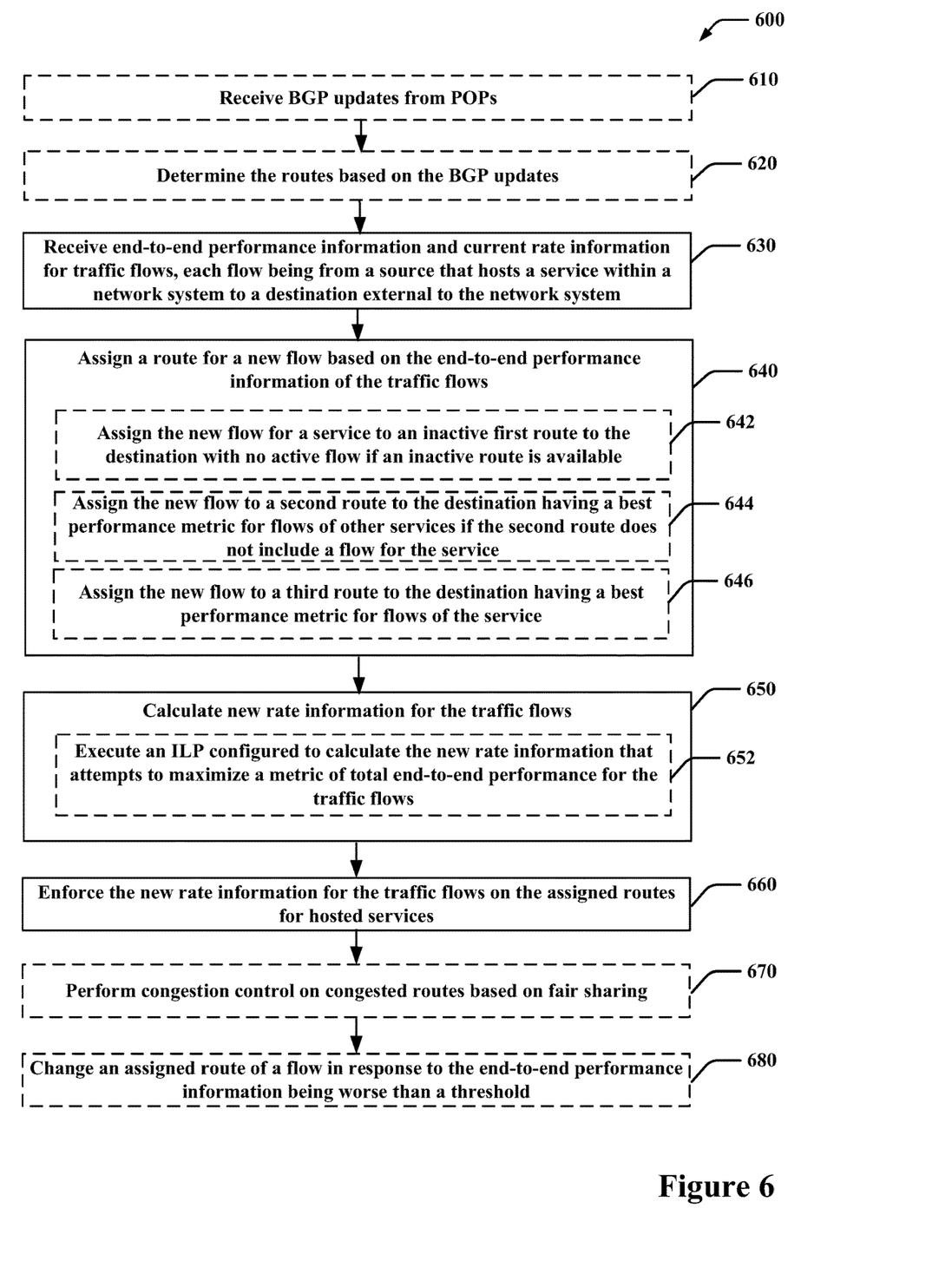
FIG. 6 is a flowchart of an example method for assigning rates and routes to egress traffic, in accordance with aspects described herein.

FIG. 6 is a flow diagram of an example of a method 600 for egress traffic control in an OSP network. For example, the method 600 can be performed by the apparatus 400, the datacenters 130 and/or one or more components thereof to route egress traffic from end-hosts 134 in the OSP network 110.

At block 610, the method 600 optionally includes receiving BGP updates from POPs. In an example, the routing component 230, e.g., in conjunction with processor 402, memory 404, and operating system 406, can receive BGP updates 122 from POPs 120.

At block 620, the method 600 optionally includes determining the routes based on the BGP updates. In an example, the routing component 230, e.g., in conjunction with processor 402, memory 404, and operating system 406, can determine the routes 232 based on the BGP updates 122.

At block 630, the method 600 includes receiving end-to-end performance information and current rate information for traffic flows, each flow being from a source that hosts a service within a network system to a destination external to the network system. In an example, the rate assignment component 210, e.g., in conjunction with processor 402, memory 404, and operating system 406, can receive end-to-end performance information 216 (e.g., based on metrics 262) and current rate information 212 for traffic flows from the end-hosts 134. Each flow is from a source that hosts the service (e.g., end-host 134) within a network system (e.g., the OSP network 110) to a destination external to the network system.

At block 640, the method 600 includes assigning a route for a new flow based on the end-to-end performance information of the traffic flows. In an example, the datacenter controller 132, e.g., in conjunction with processor 502, memory 504, container 506 and/or FPGA 510, can assign a route 232 for a new flow 258 based on the end-to-end performance information 216 of the traffic flows. For instance, at sub-block 642, the block 640 may optionally include assigning the new flow 258 for a service to an inactive first route (e.g., inactive routes 252) to the destination with no active flow if an inactive route 252 is available. Further, at sub-block 644, the block 640 may optionally include assigning the new flow 258 to a second route to the destination having a best performance metric for flows of other services (e.g., best routes for destination 254) if the second route does not include a flow for the service. Further, at sub-block 646, the block 640 may optionally include assigning the new flow to a third route to the destination having a best performance metric for flows of the service (e.g., best route for service 256).

At block 650, the method 600 includes calculating new rate information for the traffic flows. In an example, the rate assignment component 210, e.g., in conjunction with processor 402, memory 404, and operating system 406, can calculate new rate information for the traffic flows. An aggregate rate for end-to-end flows remains constant from the current rate information 212 to the new rate information For instance, at sub-block 652, the block 650 may optionally include executing an ILP configured to calculate the new rate information 218 that attempts to maximize a metric 262 of total end-to-end performance for the traffic flows.

At block 660, the method 600 includes enforcing the new rate information for the traffic flows on the assigned routes for hosted services. In an example, the rate control component 260, e.g., in conjunction with processor 502, memory 504, and container 508, can enforce the new rate information 218 for the traffic flows 224 on the assigned routes. For instance, the rate control component 260 may limit the rate of traffic output from a service to the new rate for each flow of the service.

At block 670, the method 600 optionally includes performing congestion control on congested routes based on fair sharing. In an example, the congestion control component 264, e.g., in conjunction with processor 502, memory 504, and container 508, can perform congestion control on congested routes based on fair sharing.

At block 680, the method 600 optionally includes changing an assigned route of a flow in response to the end-to-end performance information being worse than a threshold. In an example, the datacenter controller 132, e.g., in conjunction with processor 502, memory 504, container 506 and/or FPGA 510, can change an assigned route 232 of a flow 224 in response to the end-to-end performance information 216 being worse than a threshold.

Figure 7:
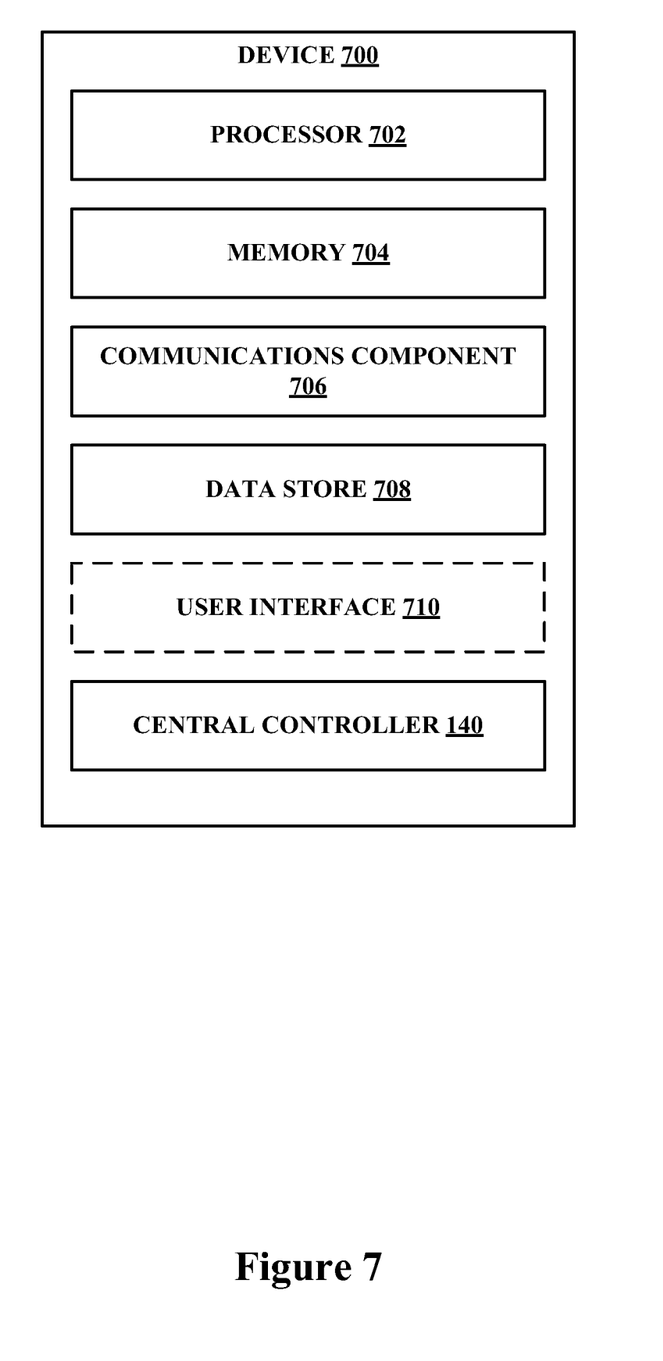
FIG. 7 is a schematic diagram of an example of a device for performing functions of egress routing described herein, in accordance with aspects described herein.

FIG. 7 illustrates an example of a device 700 including additional optional component details as those shown in FIG. 4. In one aspect, device 700 may include processor 702, which may be similar to processor 402 for carrying out processing functions associated with one or more of components and functions described herein. Processor 702 can include a single or multiple set of processors or multi-core processors. Moreover, processor 702 can be implemented as an integrated processing system and/or a distributed processing system.

Device 700 may further include memory 704, which may be similar to memory 404 such as for storing local versions of operating systems (or components thereof) and/or applications being executed by processor 702, such as the central controller 140, the rate assignment component 210, the routing component 230, the performance component 234, etc. Memory 704 can include a type of memory usable by a computer, such as random access memory (RAM), read only memory (ROM), tapes, magnetic discs, optical discs, volatile memory, non-volatile memory, and any combination thereof Further, device 700 may include a communications component 706 that provides for establishing and maintaining communications with one or more other devices, parties, entities, etc. utilizing hardware, software, and services as described herein. Communications component 706 may carry communications between components on device 700, as well as between device 700 and external devices, such as devices located across a communications network and/or devices serially or locally connected to device 700. For example, communications component 706 may include one or more buses, and may further include transmit chain components and receive chain components associated with a wireless or wired transmitter and receiver, respectively, operable for interfacing with external devices.

Additionally, device 700 may include a data store 708, which can be any suitable combination of hardware and/or software, that provides for mass storage of information, databases, and programs employed in connection with aspects described herein. For example, data store 708 may be or may include a data repository for operating systems (or components thereof), applications, related parameters, etc. not currently being executed by processor 702. In addition, data store 708 may be a data repository for the central controller 140.

Device 700 may optionally include a user interface component 710 operable to receive inputs from a user of device 700 and further operable to generate outputs for presentation to the user. User interface component 710 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 710 may include one or more output devices, including but not limited to a display, a speaker, a haptic feedback mechanism, a printer, any other mechanism capable of presenting an output to a user, or any combination thereof.

Device 700 may additionally include a central controller 140 for assigning rates for traffic egressing from end-hosts 134 in the OSP network 110, a performance component 234 for receiving end-to-end performance information and current rate information for traffic flows, each flow being from a source within the network system to a destination external to the network system, a rate assignment component 210 for calculating new rate information for the traffic flows, wherein an aggregate rate for end-to-end flows remains constant from the current rate information to the new rate information, a routing component 230 for receiving border gateway protocol updates from points of presence (POPs) and broadcast routes to destinations to the at least one datacenter controller, etc.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The following provides an overview of aspects of the present disclosure:

Aspect 1: A network system, comprising: a central controller configured to: receive end-to-end performance information and current rate information for traffic flows, each flow being from a source within the network system to a destination external to the network system, and calculate new rate information for the traffic flows, wherein an aggregate rate for end-to-end flows remains constant from the current rate information to the new rate information; at least one datacenter controller configured to assign routes for new traffic flows based on the end-to-end performance information of the traffic flows; and a plurality of end-hosts coupled with a respective one of the at least one datacenter controller and configured to enforce the new rate information for the traffic flows on the assigned routes.

Aspect 2: The network system of Aspect 1, wherein the central controller is further configured to receive border gateway protocol updates from points of presence (POPs) and broadcast routes to destinations to the at least one datacenter controller.

Aspect 3: The network system of Aspects 1 or 2, wherein the central controller is configured with an integer linear program (ILP) configured to calculate the new rate information that attempts to maximize a total weighted metric of end-to-end performance for the traffic flows.

Aspect 4: The network system of Aspect 3, wherein the ILP is constrained by a capacity of each respective route estimated based on the current rate information for traffic flows assigned to the respective route.

Aspect 5: The network system of Aspects 3 or 4, wherein the ILP is constrained by a jitter limit that defines a maximum change of the rate for a flow.

Aspect 6: The network system of any of Aspects 1-5, wherein the end-to-end performance information is normalized for different traffic flows for one or more services based on a best end-to-end performance metric of a flow for each of the one or more services.

Aspect 7: The network system of any of v 1-6, wherein the at least one datacenter controller is implemented on a field programmable gate array (FPGA).

Aspect 8: The network system of any of Aspects 1-7, wherein the at least one datacenter controller is configured to assign a new flow for a service to an inactive first route to the destination with no active flow if an inactive route is available; assign the new flow to a second route to the destination having a best performance metric for flows of other services if the second route does not include a flow for the service; or assign the new flow to a third route to the destination having a best performance metric for flows of the service.

Aspect 9: The network system of any of Aspects 1-8, at least one datacenter controller is configured to change an assigned route of a flow in response to a metric of the end-to-end performance information being worse than a threshold.

Aspect 10: The network system of any of Aspects 1-9, wherein the plurality of end-hosts are further configured to report the current rate information for traffic flows to the central controller and perform congestion control based on fair sharing.

Aspect 11: A method of network traffic routing, comprising: receiving end-to-end performance information and current rate information for traffic flows, each flow being from a source within a network system to a destination external to the network system; assigning a route for a new flow based on the end-to-end performance information of the traffic flows; calculating new rate information for the traffic flows, wherein an aggregate rate for end-to-end flows remains constant from the current rate information to the new rate information; and enforcing the new rate information for the traffic flows on the assigned routes.

Aspect 12: The method of Aspect 11, further comprising: receiving border gateway protocol (BGP) updates from points of presence (POPs); and determining the routes based on the BGP updates.

Aspect 13: The method of Aspect 11 or 12, wherein calculating the new rate information for the traffic flows comprises executing an integer linear program (ILP) configured to calculate the new rate information that attempts to maximize a metric of total end-to-end performance for the traffic flows.

Aspect 14: The method of Aspect 13, wherein the ILP is constrained by a capacity of each respective route estimated based on the current rate information for traffic flows assigned to the respective route.

Aspect 15: The method of Aspect 13, wherein the ILP is constrained by a jitter limit that defines a maximum change of the rate for a flow.

Aspect 16: The method of any of Aspects 11-15, wherein the end-to-end performance information is normalized for different traffic flows for one or more services based on a best end-to-end performance metric of a flow for the service.

Aspect 17: The method of any of Aspects 11-16, wherein assigning a route for a new flow comprises: assigning the new flow for a service to an inactive first route to the destination with no active flow if an inactive route is available; assigning the new flow to a second route to the destination having a best performance metric for flows of other services if the second route does not include a flow for the service; or assigning the new flow to a third route to the destination having a best performance metric for flows of the service.

Aspect 18: The method of any of Aspects 11-17, further comprising changing an assigned route of a flow in response to the end-to-end performance information being worse than a threshold.

Aspect 19: The method of any of Aspects 11-18, further comprising performing congestion control on congested routes based on fair sharing.

Aspect 20: A non-transitory computer-readable medium storing computer executable instructions, that when executed by a processor, cause the processor to receive border gateway protocol (BGP) updates from points of presence (POPs) where a network system is peered with other networks; determine routes to destinations in the other networks based on the BGP updates; receive end-to-end performance information and current rate information for traffic flows, each flow being from a source within the network system that hosts a service to a destination, and calculate new rate information for the traffic flows, wherein an aggregate rate for end-to-end flows remains constant from the current rate information to the new rate information.

Aspect 21: A non-transitory computer-readable medium storing computer executable instructions, that when executed by a processor, cause the processor to perform the method of any of the above Aspects.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An online service provider (OSP) network system, comprising:
   a central controller configured to:
      receive end-to-end performance information and current rate information for traffic flows, each flow being from a source that hosts a service within the network system to a destination external to the network system, and
      calculate new rate information for the traffic flows, wherein an aggregate rate for end-to-end flows remains constant from the current rate information to the new rate information;
   at least one datacenter controller configured to assign one route of a plurality of available routes to a new traffic flow at a respective source of the new traffic flow based on the end-to-end performance information of the traffic flows; and
   a plurality of end-hosts coupled with a respective one of the at least one datacenter controller and configured to enforce the new rate information for the traffic flows on the assigned routes for services hosted by the end-host.

2. The network system of claim 1, wherein the central controller is further configured to receive border gateway protocol updates from points of presence (POPs) and broadcast routes to destinations to the at least one datacenter controller.

3. The network system of claim 1, wherein the central controller is configured with an integer linear program (ILP) configured to calculate the new rate information that attempts to maximize a total weighted metric of end-to-end performance for the traffic flows.

4. The network system of claim 3, wherein the ILP is constrained by a capacity of each respective route estimated based on the current rate information for traffic flows assigned to the respective route.

5. The network system of claim 3, wherein the ILP is constrained by a jitter limit that defines a maximum change of the rate for a flow.

6. The network system of claim 1, wherein the end-to-end performance information is normalized for different traffic flows for one or more services based on a best end-to-end performance metric of a flow for each of the one or more services.

7. The network system of claim 1, wherein the at least one datacenter controller is implemented on a field programmable gate array (FPGA).

8. The network system of claim 1, wherein to assign one route of a plurality of selectable routes to the new traffic flow at the respective source of the new traffic flow, the at least one datacenter controller is configured to assign the new flow for a service to an inactive first route to the destination with no active flow if an inactive route is available; assign the new flow to a second route to the destination having a best performance metric for flows of other services if the second route does not include a flow for the service; or assign the new flow to a third route to the destination having a best performance metric for flows of the service.

9. The network system of claim 1, wherein at least one datacenter controller is configured to change an assigned route of a flow in response to a metric of the end-to-end performance information being worse than a threshold.

10. The network system of claim 1, wherein the plurality of end-hosts are further configured to report the current rate information for traffic flows to the central controller and perform congestion control based on fair sharing.

11. A method of traffic routing for an online service provider (OSP) network system, comprising:
   receiving end-to-end performance information and current rate information for traffic flows, each flow being from a source that hosts a service within a network system to a destination external to the network system;
   assigning a route of a plurality of available routes for a new traffic flow at a respective source of the new traffic flow based on the end-to-end performance information of the traffic flows;
   calculating new rate information for the traffic flows, wherein an aggregate rate for end-to-end flows remains constant from the current rate information to the new rate information; and
   enforcing the new rate information for the traffic flows on the assigned routes for hosted services.

12. The method of claim 11, further comprising:
   receiving border gateway protocol (BGP) updates from points of presence (POPS); and
   determining the routes based on the BGP updates.

13. The method of claim 11, wherein calculating the new rate information for the traffic flows comprises executing an integer linear program (ILP) configured to calculate the new rate information that attempts to maximize a metric of total end-to-end performance for the traffic flows.

14. The method of claim 13, wherein the ILP is constrained by a capacity of each respective route estimated based on the current rate information for traffic flows assigned to the respective route.

15. The method of claim 13, wherein the ILP is constrained by a jitter limit that defines a maximum change of the rate for a flow.

16. The method of claim 11, wherein the end-to-end performance information is normalized for different traffic flows for one or more services based on a best end-to-end performance metric of a flow for the service.

17. The method of claim 11, wherein assigning the route of the plurality of available routes to the new traffic flow at the respective source of the new traffic flow comprises:

assigning the new traffic flow for a service to an inactive first route to the destination with no active flow if an inactive route is available:

assigning the new traffic flow to a second route to the destination having a best performance metric for flows of other services if the second route does not include a flow for the service; or assigning the new traffic flow to a third route to the destination having a best performance metric for flows of the service.

18. The method of claim 11, further comprising changing an assigned route of a flow in response to the end-to-end performance information being worse than a threshold.

19. The method of claim 11, further comprising performing congestion control on congested routes based on fair sharing.

20. A non-transitory computer-readable medium storing computer executable instructions, that when executed by a processor, cause the processor to:

receive border gateway protocol (BGP) updates from points of presence (POPs) where a network system is peered with other networks;

determine routes to destinations in the other networks based on the BGP updates;

receive end-to-end performance information and current rate information for traffic flows, each flow being from a source that hosts a service within the network system to a destination;

assign a route of a plurality of available routes for a new traffic flow at a respective source of the new traffic flow based on the end-to-end performance information of the traffic flows; and calculate new rate information for the traffic flows, wherein an aggregate rate for end-to-end flows remains constant from the current rate information to the new rate information.

* * * * *